US 12,261,429 B2

(12) United States Patent
Barjati et al.

(10) Patent No.: US 12,261,429 B2
(45) Date of Patent: Mar. 25, 2025

(54) SHORT DETECTION CIRCUIT

(71) Applicant: TEXAS INSTRUMENTS INCORPORATED, Dallas, TX (US)

(72) Inventors: Rampal Barjati, Sikar (IN); Akhila Gundavarapu, Bangalore (IN); Lokesh Ghulyani, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 298 days.

(21) Appl. No.: 18/059,696

(22) Filed: Nov. 29, 2022

(65) Prior Publication Data
US 2024/0006993 A1 Jan. 4, 2024

(30) Foreign Application Priority Data
Jun. 29, 2022 (IN) .............................. 202241037202

(51) Int. Cl.
H02H 9/02 (2006.01)
H02M 1/00 (2006.01)
H02M 3/07 (2006.01)

(52) U.S. Cl.
CPC .......... H02H 9/025 (2013.01); H02M 1/0009 (2021.05); H02M 3/07 (2013.01)

(58) Field of Classification Search
CPC .............................. H02H 9/025; H02M 1/0009
See application file for complete search history.

(56) References Cited

U.S. PATENT DOCUMENTS

| 10,168,363 | B1 * | 1/2019 | Petenyi | H02H 9/025 |
| 11,201,459 | B1 | 12/2021 | Narasimha | |
| 11,251,600 | B2 | 2/2022 | Trumbo | |
| 11,563,430 | B2 * | 1/2023 | Piila | H03K 17/161 |
| 2013/0188287 | A1 * | 7/2013 | Imura | H02H 3/18 361/56 |
| 2017/0060152 | A1 * | 3/2017 | Martini | H02H 9/025 |
| 2018/0123578 | A1 * | 5/2018 | Chauhan | H03K 17/0822 |
| 2019/0109453 | A1 * | 4/2019 | Neyman | H02H 9/025 |
| 2020/0076190 | A1 * | 3/2020 | La Rosa | H02H 11/003 |

* cited by examiner

Primary Examiner — Kyle J Moody
Assistant Examiner — Jye-June Lee
(74) Attorney, Agent, or Firm — Charles F. Koch; Frank D. Cimino

(57) ABSTRACT

A short detection circuit includes a first transistor, a switched load circuit, a second transistor, a switched capacitor circuit, and a comparator. The first transistor is configured to conduct a load current. The switched load circuit is coupled to the first transistor. The switched load circuit is configured to switchably draw a test current. The second transistor is coupled to the first transistor. The second transistor is configured to conduct a sense current. The sense current includes first and second portions that are respectively representative of the load current and the test current. The switched capacitor circuit is coupled to the second transistor. The switched capacitor circuit is configured to generate a short detection voltage representative of the second portion. The comparator has a first comparator input coupled to the switched capacitor circuit. The comparator is configured to compare the short detection voltage to a short threshold voltage.

21 Claims, 7 Drawing Sheets

SHORT DETECTION CIRCUIT

CROSS-REFERENCE TO RELATED APPLICATIONS

This application claims priority to Indian Provisional Application No. 202241037202, filed Jun. 29, 2022, entitled "Load Protection Through Dynamic Detection of In-Out Short of Pass FET in EFuse," which is hereby incorporated by reference.

BACKGROUND

A circuit protection device, such as a fuse or circuit breaker, protects an electrical circuit from damage due to over-current or short-circuit conditions. An over-current condition occurs when the electrical current flowing in a circuit (e.g., due to the demands of a load) exceed the design rating of the circuit. A short-circuit condition occurs when an electrically conductive elements of a circuit makes contact causing electrical current to bypass the circuit's electrical load, which can result in very high electrical currents. Over-current and short-circuit conditions can damage conductors and other components of an electrical circuits due to overheating of the conductor wires and result in burning of the wire insulation. A circuit protection device detects the occurrence of an over-current or short-circuit condition, and opens an electrical switch or otherwise decreases current flow to the protected electrical circuit to prevent circuit damage.

Fuses, positive temperature coefficient resistors, and active circuit protection are a few of the available circuit protection devices. Fuses are typically used to isolate overload or short-circuit faults from the main system. However, fault current generally needs to be much higher than the rating of the fuse, and response time ranges from milliseconds to seconds making it difficult to predict the precise overcurrent level at which the fuse will open. Once the fuse opens it must be physically replaced, which increases system down time and maintenance costs. Positive temperature coefficient resistors provide resettable overcurrent protection and, unlike a fuse, do not require replacement. The reaction time of positive temperature coefficient resistors is in the range of several milliseconds, and the resistance increases with each activation.

Active circuit protection devices measure the current flowing through a field effect transistor (FET), and control the resistance of the FET to limit current flowing to the load when a fault condition is detected. Active current protection devices can respond more quickly and provide more accurate fault detection than passive solutions.

SUMMARY

Circuitry for detecting a short in or across a pass transistor is described herein. In one example, a short detection circuit includes a first transistor, a first resistor, a second transistor, a current source, a second resistor, switched capacitor circuit, and a comparator. The first transistor has a first current terminal, second current terminal, and a first control terminal. The first resistor is coupled between the second current terminal and a ground terminal. The second transistor has a third current terminal, a fourth current terminal, and a second control terminal. The third current terminal is coupled to the first current terminal. The second control terminal is coupled to the first control terminal. The current source has a current output and a current input. The current input is coupled to the fourth current terminal. The second resistor is coupled between the current output and the ground terminal. The switched capacitor circuit is coupled between the current output and the ground terminal. The comparator has a comparator output, a first comparator input, and a second comparator input. The first comparator input is coupled to the switched capacitor circuit. The second comparator input is coupled to a reference voltage terminal.

In another example, a short detection circuit includes a first transistor, a switched load circuit, a second transistor, a switched capacitor circuit, and a comparator. The first transistor is configured to conduct a load current. The switched load circuit is coupled to the first transistor. The switched load circuit is configured to switchably draw a test current. The second transistor is coupled to the first transistor. The second transistor is configured to conduct a sense current. The sense current includes first and second portions. The first portion is representative of the load current, and the second portion is representative of the test current. The switched capacitor circuit is coupled to the second transistor. The switched capacitor circuit is configured to generate a short detection voltage representative of the second portion. The comparator has an output, a first comparator input, and a second comparator input. The first comparator input is coupled to the switched capacitor circuit. The comparator is configured to compare the short detection voltage to a short threshold voltage.

In a further example, a system includes a power terminal, a load terminal, and an electronic fuse (EFUSE) circuit. The EFUSE circuit includes a first transistor, a switched load circuit, a second transistor, a switched capacitor circuit, and a comparator. The first transistor is configured to conduct a load current from the power terminal to the load terminal. The switched load circuit is coupled to the first transistor. The switched load circuit is configured to switchably sink a test current. The second transistor is coupled to the first transistor. The second transistor is configured to conduct a sense current. The sense current includes first and second portions. The first portion is representative of the load current, and the second portion is representative of the test current. The switched capacitor circuit is coupled to the second transistor. The switched capacitor circuit is configured to generate a short detection voltage representative of the second portion. The comparator has an output, a first comparator input, and a second comparator input. The first comparator input is coupled to the switched capacitor circuit. The comparator is configured to compare the short detection voltage to a short threshold voltage.

DETAILED DESCRIPTION

Many electrical systems include active circuit protection devices, such as electronic fuses (EFUSEs) to limit power to the system, or a portion of the system, should a fault occur. However, if the fault is failure of the pass transistor of the EFUSE, the EFUSE is unable to limit the power provided to the system. Failures related to the pass transistor of an EFUSE include external shorts caused by the miswiring or unintended solder connections, of a fault in the pass transistor itself. Some systems attempt to provide protection from such shorts by using two EFUSEs in series, so that if one EFUSE fails the other can limit power to the system. However, use of multiple EFUSEs increases system size (circuit area) and cost.

The short detection circuit described herein can be used in an EFUSE or other electronic system to detect internal or external shorting of a pass transistor. The short detection switchably connects a current source to the output of the pass transistor. Current flowing through the pass transistor is represented by a sense current flowing through a sense transistor. A short is deemed present if the sense current due to the current source is less than a threshold value. The sense current due to the current source is detected by a switched capacitor circuit that generates a voltage representing the difference of the sense current flowing with and without connection of the current source to the pass transistor.

Figure 1:
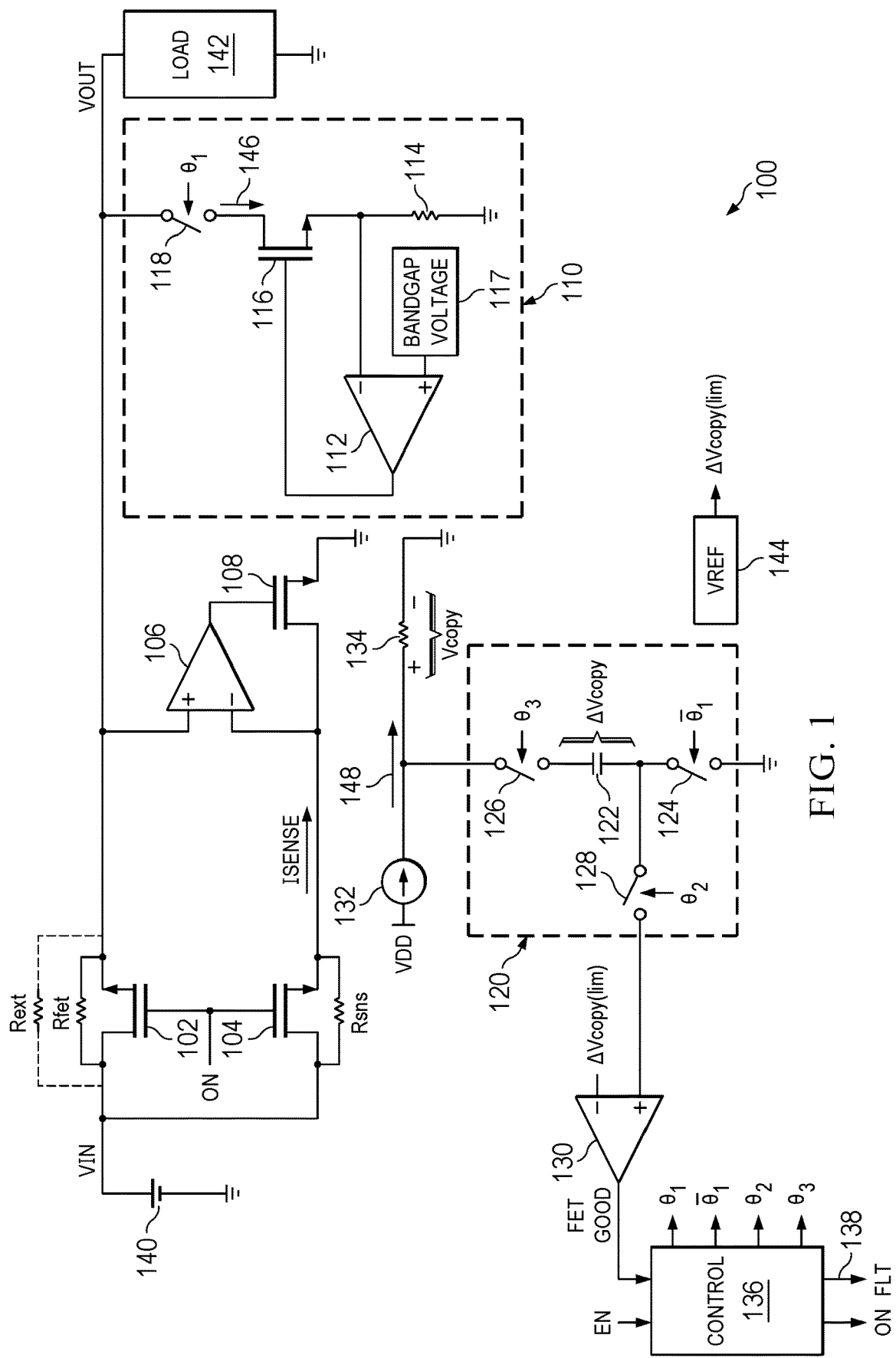
FIG. 1 is a schematic level diagram of an example short detection circuit.

FIG. 1 is a schematic level diagram of an example short detection circuit 100. The short detection circuit 100 includes a pass transistor 102, a sense transistor 104, an amplifier 106, a transistor 108, a switched current source 110, a switched capacitor circuit 120, a comparator 130, a current source 132, a resistor 134, and a control circuit 136. The short detection circuit 100 is coupled between a voltage source 140 (e.g., a power terminal) and a load 142 (e.g., a load terminal) to pass power from the voltage source 140 to the load 142 through the pass transistor 102. The voltage source 140 may be a battery, a power supply circuit, or other voltage generating device. The load 142 may be an electrical or electronic circuit.

The pass transistor 102, the sense transistor 104, and the transistor 108 may be n-channel field effect transistors (NFETs). The sense transistor 104 is coupled in parallel with the pass transistor 102. A first current terminal (e.g., drain) of the pass transistor 102 is coupled to a first current terminal (e.g., drain) of the sense transistor 104, and a control terminal (e.g., gate) of the pass transistor 102 is coupled to a control terminal (e.g., gate) of the sense transistor 104. The sense current (ISENSE) flowing through the sense transistor 104 is representative of the current flowing through the pass transistor 102 to the load 142.

In FIG. 1, a resistor Rext represents an external resistance across the pass transistor 102, a resistor Rfet represents the resistance of the pass transistor 102, and resistor Rsns represents the resistance of the sense transistor 104. The resistance of Rext will be small (e.g., less than 40 milliohms) if an external short is present across the pass transistor 102. Similarly, the resistance of Rfet may be below a selected value (<30 milliohms) if the pass transistor is faulty. The sense transistor 104 may be a scaled replica of the pass transistor 102. For example, the channel width of the pass transistor 102 may be N time greater than the channel width of the sense transistor 104, so that the current flowing through the pass transistor 102 is N times greater than the sense current flowing through the sense transistor 104.

The amplifier 106 and the transistor 108 are coupled to the sense transistor 104 to maintain the second current terminal of the sense transistor 104 at the same potential as the second current terminal of the pass transistor 102. A first input of the amplifier 106 is coupled to the second current terminal of the pass transistor 102, and a second input of the amplifier 106 is coupled to the second current terminal of the sense transistor 104. A first current terminal (e.g., drain) of the transistor 108 is coupled to the second input of the amplifier 106, and second current terminal (e.g., source) of the transistor 108 is coupled to a ground terminal. A control terminal (e.g., gate) of the transistor 108 is coupled to the output of the amplifier 106. The transistor 108 sinks ISENSE, and the amplifier 106 controls the voltage at the control terminal of the transistor 108 to make the voltage at the second current terminal of the sense transistor 104 equal to the voltage at the second current terminal of the pass transistor 102.

The short detection circuit 100 has no control over the load 142, so short detection circuit 100 cannot identify a short based on the current flowing to the load 142. The short detection circuit 100 includes the switched current source 110 to receive (sink) a predetermined test current for determining whether a short (internal or external) is present across the pass transistor 102. The switched current source 110 includes an amplifier 112, a resistor 114, a transistor 116, and a switch 118. A first current terminal (e.g., drain) of the transistor 116 is coupled to the second current terminal of the pass transistor 102 through the switch 118. A second current terminal (e.g., source) of the transistor 116 is coupled to a first input (e.g., inverting amplifier input) of the amplifier 112. A control terminal (e.g., gate) of the transistor 116 is coupled to an output of the amplifier 112. A second input (e.g., non-inverting amplifier input) is coupled to a reference terminal of a bandgap voltage circuit 117. The resistor 114 is coupled between the second current terminal of the transistor 116 and the ground terminal. The resistor 114 includes a first resistor terminal coupled to the amplifier 112 and a second resistor terminal coupled to a ground terminal. The switch 118 includes a first terminal coupled to the second current terminal of the pass transistor 102, a second terminal coupled to the first current terminal of the transistor 116, and a control terminal coupled to the control circuit 136. The signal provided at the amplifier output controls the transistor 116 to make the voltage at the first input of the amplifier 112 equal to the bandgap voltage provided at the second input of the amplifier 112 and set the current flowing through the switch 118, the transistor 116, and the resistor 114 when the switch 118 is closed. The control circuit 136 closes the switch 118 to test for a short across the pass transistor 102.

The current source 132 generates a current that is equal to or representative of ISENSE flowing through the sense transistor 104. The current source 132 may be implemented as a current mirror circuit with a current output coupled to the resistor 134. The resistor 134 is coupled between the current source 132 and the ground terminal. The current 148 generated by the current source 132 flows through the resistor 134 to develop a sense voltage that is representative of the current flowing through the pass transistor 102. A first terminal of the resistor 134 is coupled to the current source 132, and a second terminal of the resistor 134 is coupled to the ground terminal. The resistor 134 and the resistor 114 may be a same type of resistor (produced using a same fabrication process) to cancel out each other's variation and provide improved accuracy. The resistor 134 and the resistor 114 may be high sheet resistors. The resistor 134 may have a resistance of about 5 kiloohms and the resistor 114 may have a resistance of about 53 ohms.

The switched capacitor circuit 120 includes a capacitor 122, a switch 124, a switch 126, and a switch 128. The capacitor 122 includes a top plate and a bottom plate. The top plate is coupled to the first terminal of the resistor 134 through the switch 126. The switch 126 includes a first terminal coupled to the first terminal of the resistor 134, a second terminal coupled to the top plate of the capacitor 122, and a control terminal coupled to the control circuit 136. The switch 124 is coupled between the bottom plate of the capacitor 122 and the ground terminal. The switch 124 includes a first terminal coupled to the bottom plate of the capacitor 122, a second terminal coupled to the ground terminal, and a control terminal coupled to the control circuit 136. The switch 128 is coupled between the bottom plate of the capacitor 122 and a first input (e.g., non-inverting comparator input) of the comparator 130. The switch 128 includes a first terminal coupled to the bottom plate of the capacitor 122, a second terminal coupled to the first input of the comparator 130, and a control terminal coupled to the control circuit 136. A second input (e.g., inverting comparator input) of the comparator 130 is coupled to a reference voltage terminal of the reference voltage circuit 144. The reference voltage circuit 144 generates a short threshold voltage that the comparator 130 compares to the voltage at the bottom plate of the capacitor 122 to identify a short across the pass transistor 102.

When the control circuit 136 opens the switch 118, current flows through the pass transistor 102, and any short across the pass transistor 102, to the load 142. The current generated by the current source 132, and the voltage across the resistor 134, are representative of the current flowing through the pass transistor 102 to the load 142. When the switch 118 is open, the switch 124 is closed to connect the bottom plate of the capacitor 122 to the ground terminal, and the switch 126 is closed to connect the top plate of the capacitor 122 to the resistor 134. When the switch 118 is open, the capacitor 122 is charged to the voltage developed across the resistor 134. When the control circuit 136 closes the switch 118 to sink the current 146 through the transistor 116 and the resistor 114, the switch 124 is open to disconnect the bottom plate of the capacitor 122 from the ground terminal. The current flowing through the pass transistor 102 increases according to the current 146 flowing through the switched current source 110. If there is no short across the pass transistor 102, then all of the current flowing through the switched current source 110 flows through the pass transistor 102. If there is a short across the pass transistor 102, then only a portion of the current flowing through the switched current source 110 flows through the pass transistor 102. The voltage developed across the resistor 134 corresponds to the current flowing through the pass transistor 102.

When the control circuit 136 closes the switch 118, the control circuit 136 closes the switch 126 and the voltage across the resistor 134 is present on the top plate of the capacitor 122. The voltage on the bottom plate of the capacitor 122 is equal to the difference of the voltage across the resistor 134 when the switch 118 is closed and the voltage across the resistor 134 when the switch 118 is open. Accordingly, when the switch 118 is closed, the voltage at the bottom plate of the capacitor 122 is representative of the portion of the current 146 flowing through the pass transistor 102.

The control circuit 136 closes the switch 128 to connect the bottom plate of the capacitor 122 to the comparator 130. The comparator 130 compares the short detection voltage (ΔVcopy) at the bottom plate of the capacitor 122 to the short threshold voltage (ΔVcopy(lim)) generated by the reference voltage circuit 144. If the voltage at the bottom plate of the capacitor 122 is greater than ΔVcopy(lim), then the current through the pass transistor 102 is high enough that no short is deemed present across the pass transistor 102. If the voltage at the bottom plate of the capacitor 122, is less than ΔVcopy(lim), then not all of the current flowing through the switched current source 110 is flowing through the pass transistor 102, and a short is deemed present across the pass transistor 102. The output of the comparator 130 is coupled to the control circuit 136. Based on the output signal (FET GOOD) provided at the comparator output, the control circuit 136 sets the state of fault signal 138 provided at an output of the control circuit 136. The fault signal 138 indicates whether a short is detected across the pass transistor 102.

The switch 118, the switch 124, the switch 126, and the switch 128 may be implemented using one or more transistors (e.g., NFET and/or PFET) arranged to pass a signal responsive to a control signal.

Figure 2:
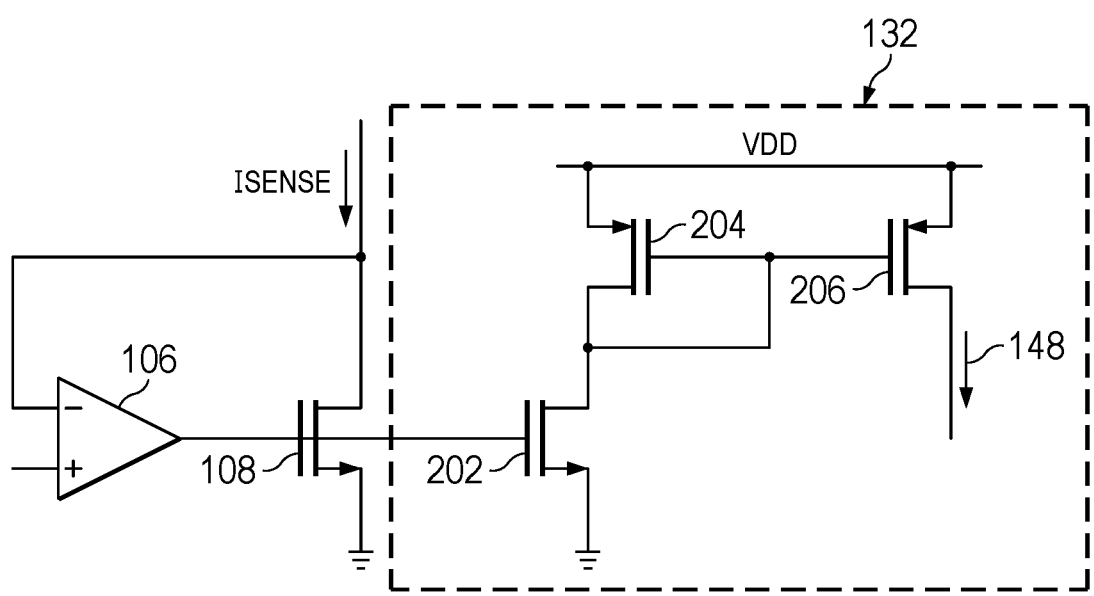
FIG. 2 is a schematic diagram of an example current source suitable for use in the short detection circuit of FIG. 1.

FIG. 2 is a schematic diagram of an example current source 132. The 132 includes a transistor 202, a transistor 204, and a transistor 206. The 202 may be an NFET. The 204 and the 206 may be PFETs. A control terminal (e.g., gate) of the 202 is coupled to the output of the amplifier 106 and the control terminal of the transistor 108. A first current terminal (e.g., source) of the 202 is coupled to the ground terminal. A second current terminal of the 202 is coupled to the 204 and the 206.

The 204 and the 206 are connected as a current mirror circuit. The 204 is diode-connected. A first current terminal (e.g., source) of the 204 is coupled to a power supply terminal. A second current terminal (e.g., drain) of the 204 is coupled to the second control terminal of the 202. A control terminal (e.g., gate) of the 204 is coupled to the second control terminal of the 204. A first current terminal (e.g., source) of the 206 is coupled to the first current terminal of the 204. A control terminal of the 206 is coupled to the control terminal of the 204. A second current terminal (e.g., drain) of the 206 is coupled to the 134 and the 126.

The current flowing through the 202 and the 204 is the same as (or a scaled replica of) the sense current (ISENSE) flowing through the 108. The 148 flowing through the 206 is the same as (or a scaled replica of) the current flowing through the 204 and the 202.

Figure 3A:
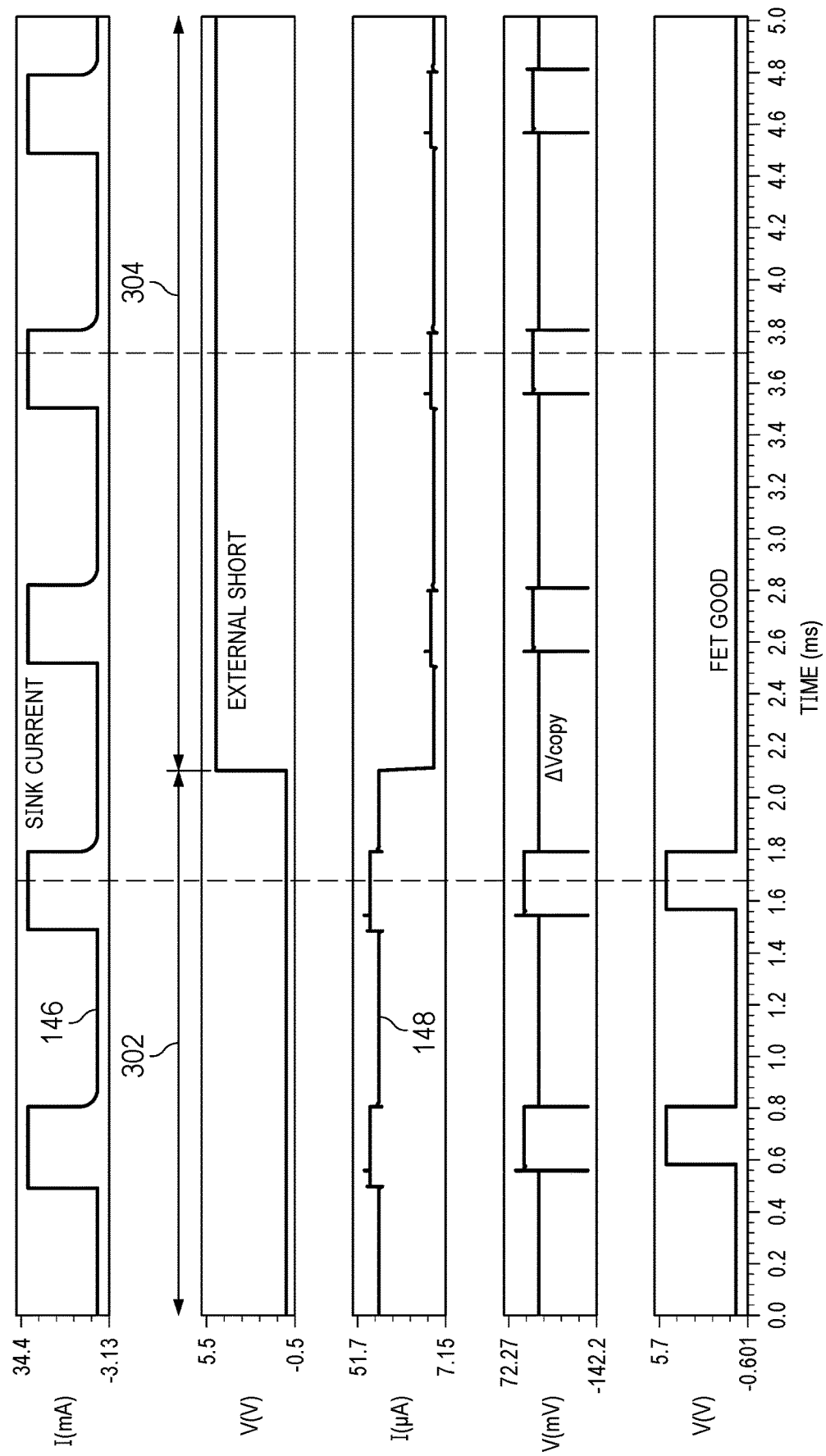
FIGS. 3A and 3B are diagrams of example signals generated in the short detection circuit of FIG. 1.

FIG. 3A is diagram of example signals generated in the short detection circuit 100. FIG. 3A shows the current 146 flowing through the switched current source 110, the current 148 flowing through the resistor 134, the voltage ΔVcopy at the bottom plate of the capacitor 122, and FET GOOD output by the comparator 130. The current 146 increases when the switch 118 is closed. In some implementations of the switched current source 110, the current 146 flowing through the switched current source 110 is about 30 milliamperes (ma). As the switched current source 110 sinks current, the current 148 increases, and the voltage ΔVcopy increases. In the interval 302, no short is present across the pass transistor 102, the voltage ΔVcopy exceeds ΔVcopy(lim), and FET GOOD is high during the test to indicate that no short is present across the pass transistor 102. For example, ΔVcopy may be about 30 millivolts (mv) when no short is present, and ΔVcopy(lim) may be about 19 mv. In the interval 304, an external short is present across the pass transistor 102. As a result of the short, the increase in the current 148 and in ΔVcopy due to the current 146 is small (relative the increase when no short is present). ΔVcopy is less than ΔVcopy(lim), and FET GOOD is low during the test to indicate that a short is present across the pass transistor 102. For example, ΔVcopy may be about 10 millivolts (my) when a short is present.

Figure 3B:
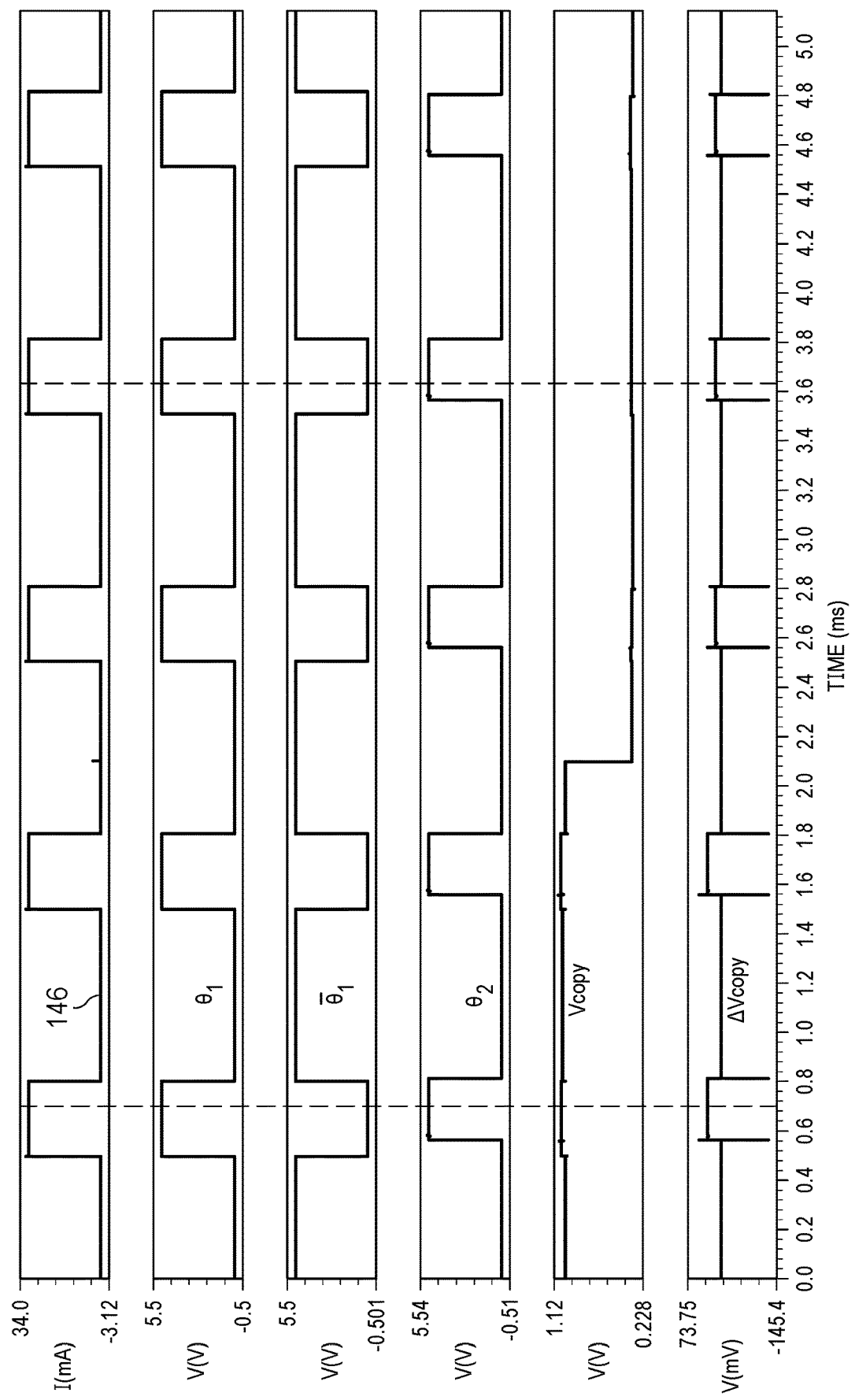

FIG. 3B is a graph of signals in the short detection circuit 100. FIG. 3B shows the signals $\theta_1$, $\overline{\theta}_1$, $\theta_2$ generated by the control circuit 136 to control the switch 118, the switch 124, and the switch 128, respectively. FIG. 3B also shows the current 146, Vcopy, and ΔVcopy. The control circuit 136 activates $\theta_1$ to close the switch 118 and increase the current 146. At about 2.1 milliseconds, a short is formed across the pass transistor 102. Prior to formation of the short, ΔVcopy increases by relatively large amount responsive to the current 146. Subsequent to formation of the short, ΔVcopy increases by a relatively small amount responsive to the current 146, enabling detection of the short by the comparator 130.

Because the load 142 is not controlled by the short detection circuit 100, the current drawn by the load 142, and flowing through the pass transistor 102 and any short across the pass transistor 102, can change at any time, causing changes in ΔVcopy that may cause errors in short detection. For example, the current drawn by the load 142 may change during a short detection cycle (when the switch 118 is closed). To increase the accuracy of short detection, the control circuit 136 executes multiple randomly spaced short detection cycles, and determines whether a short is present based on the results provided by a majority of the short detection cycles. For example, the control circuit 136 may execute 5 randomly spaced 600 microsecond short detection cycles (time during which the switch 118 is closed) in a 200 millisecond interval. The control circuit 136 identifies the presence or non-presence of a short based on the short state indicated by three of the five cycles.

Figure 4:
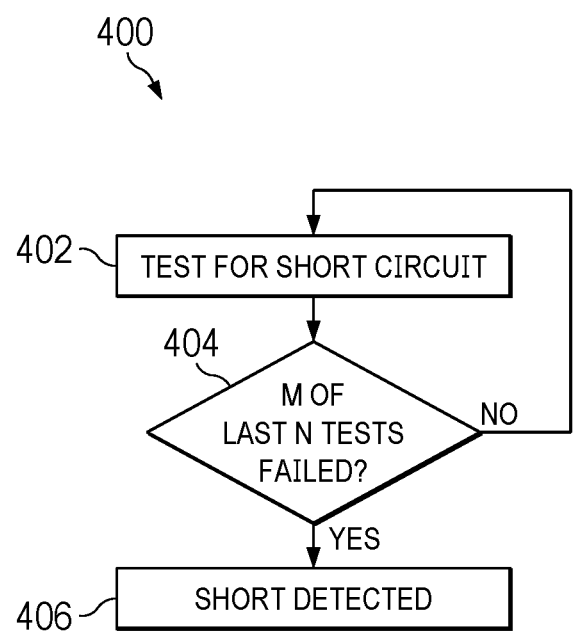
FIG. 4 is a flow diagram for an example method of determining whether a short is present based on multiple short detection tests.

FIG. 4 is a flow diagram for an example method of determining whether a short is present based on multiple short detection tests. Though depicted sequentially as a matter of convenience, at least some of the actions shown can be performed in a different order and/or performed in parallel. Additionally, some implementations may perform only some of the actions shown. Operations of the method 400 may be performed by the control circuit 136.

In block 402, the control circuit 136 executes a short detection test. The short detection test includes charging the capacitor 122 to the voltage across the resistor 134 with the switch 118 open and the switch 124 closed, then closing the switch 118 and opening the switch 124, and comparing the voltage on the bottom plate of the capacitor 122 to ΔVcopy (lim). The test is deemed passed if the voltage on the bottom plate of the capacitor 122 is greater than ΔVcopy(lim), and deemed failed if the voltage on the bottom plate of the capacitor 122 is less than ΔVcopy(lim).

In block 404, the control circuit 136 evaluates the results of the last N short detection tests executed in block 402. If M of the last N short detection tests have failed, then a short across the pass transistor 102 is deemed detected in block 406. For example, if in 3 of the last 5 short detection tests, the bottom plate of the capacitor 122 is less than ΔVcopy (lim), then the control circuit 136 determines that a short has been detected across the pass transistor 102. The control circuit 136 may set the fault signal 138 to indicate that a short has been detected.

If, in block 404, M of the last N short detection tests have not failed, then short testing continues in block 402.

Figure 5:
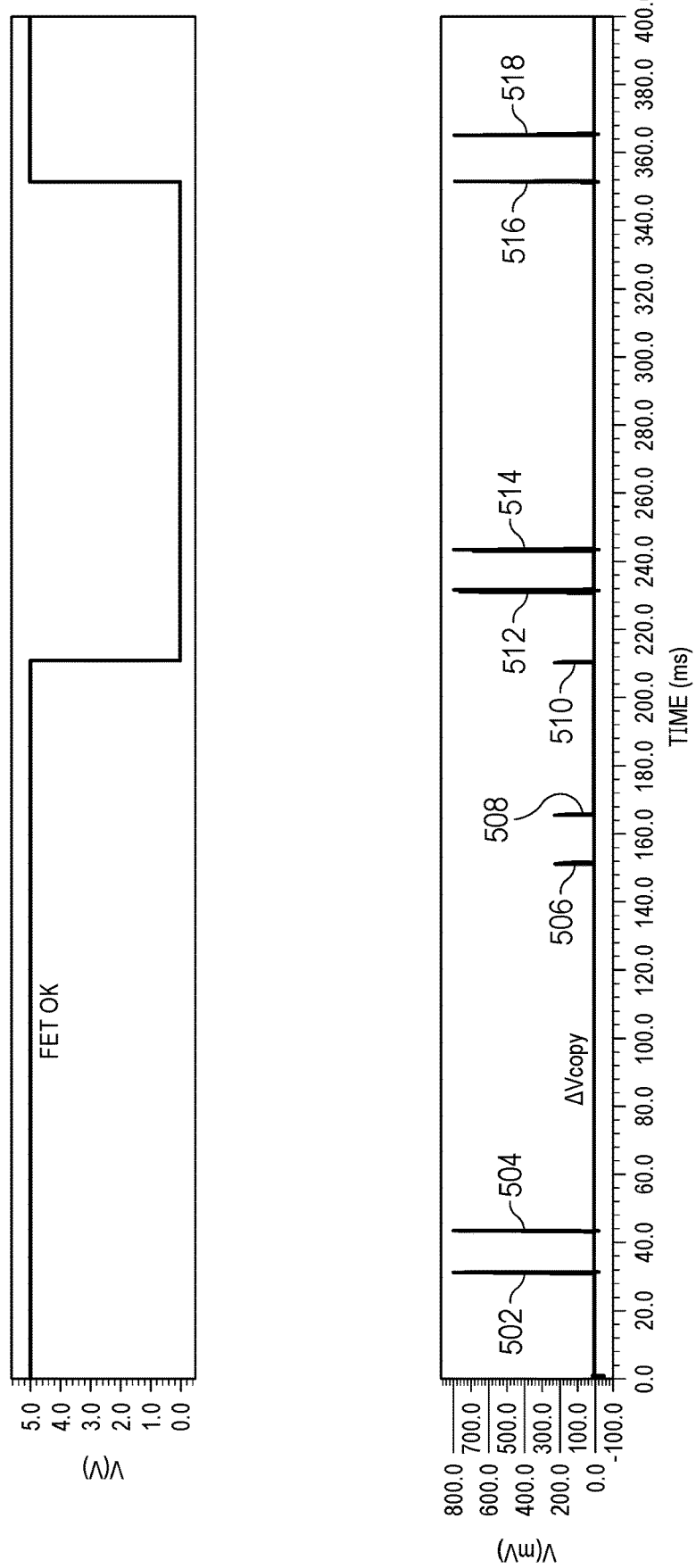
FIG. 5 is diagram of an example short fault signal generated in the short detection circuit of FIG. 1 based on the method of FIG. 4.

FIG. 5 is diagram of an example short fault signal generated in the short detection circuit 100 based on the method 400. In FIG. 5, ΔVcopy is shown over eight short detection tests. During the short detection tests 506, 508, and 510, a short is present across the pass transistor 102, so ΔVcopy is substantially lower than in the short detection tests 502, 504, 512, 514, 516, and 518. In FIG. 5, the control circuit 136 is determining whether a short is present based on the last 5 tests executed. If 3 of the last 5 tests have failed, then a short is deemed present. If 3 of the last 5 tests have not failed, then no short is deemed present. With execution of the short detection test 510, short detection tests 506, 508, and 510 have failed, so the control circuit 136 determines that a short is present. As testing continues, and short detection tests 512, 514, and 516 pass, 3 of the last 5 tests have passed, and the control circuit 136 determines that no short is present responsive to the short detection test 516.

Figure 6:
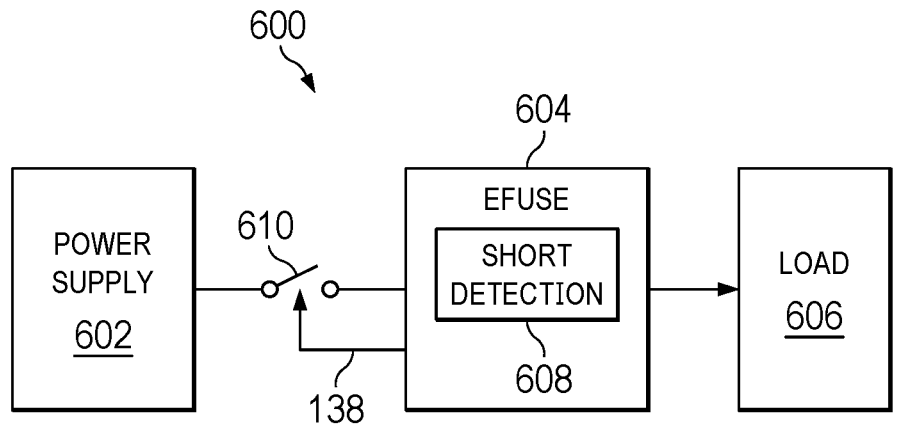
FIGS. 6 and 7 are block diagrams for example systems include an electronic fuse circuit with short detection.

FIG. 6 is a block diagram of an example system 600 that includes an EFUSE circuit 604 with short detection. The system 600 includes a power supply 602, the EFUSE circuit 604, a load circuit 606, and switch 610. The power supply 602 may be a battery, a DC-DC converter, an AC-DC converter, or other power source. The EFUSE circuit 604 includes a short detection circuit 608. The short detection circuit 608 is an implementation of the short detection circuit 100. The system 600 also includes a switch 610 coupled between the power supply 602 and the EFUSE circuit 604. The switch 610 may be implemented using a transistor (e.g., a PFET) coupled between the power supply 602 and the EFUSE circuit 604. The switch 610 includes a control terminal coupled to a fault output of the EFUSE circuit 604.

The short detection circuit 608 tests for a short (internal or external short) across the EFUSE circuit 604 as described with respect to the short detection circuit 100. If a short is detected, the EFUSE circuit 604, via the fault signal 138, opens the switch 610 to interrupt the flow of current from the power supply 602 to the EFUSE circuit 604 and the load circuit 606.

Figure 7:
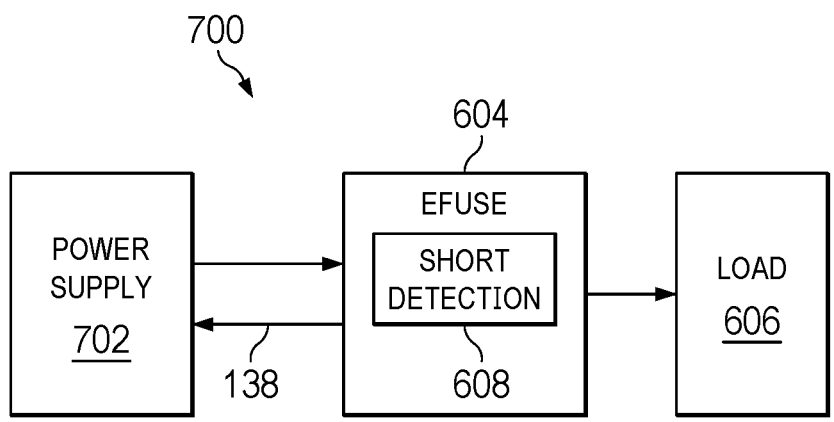

FIG. 7 is a block diagram of an example system 700 that includes an EFUSE circuit 604 with short detection. The system 700 includes a power supply 702, the EFUSE circuit 604, and the load circuit 606. The power supply 702 may be a linear regulator, a DC-DC converter, an AC-DC converter, or other power source. The EFUSE circuit 604 includes the short detection circuit 608. The short detection circuit 608 is an implementation of the short detection circuit 100. The power supply 702 includes an input terminal coupled to the fault output of the EFUSE circuit 604.

The short detection circuit 608 tests for a short (internal or external short) across the EFUSE circuit 604 as described with respect to the short detection circuit 100. If a short is detected, the EFUSE circuit 604 changes the state of the fault signal 138 to indicate that fault (a short) has been detected. Responsive to the fault signal 138, the power supply 702 discontinues provision of current to the EFUSE circuit 604 and the load circuit 606.

The system 600 or the system 700 may be an appliance, such as a refrigerator, a washing machine, a clothes dryer, an oven, a range, or other appliance, or electrical of electronic device.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Also, in this description, the recitation "based on" means "based at least in part on." Therefore, if X is based on Y, then X may be a function of Y and any number of other factors.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors are described herein, other transistors (or equivalent devices) may be used instead with little or no change to the remaining circuitry. For example, a field effect transistor ("FET") (such as an n-channel FET (NFET) or a p-channel FET (PFET)), a bipolar junction transistor (BJT—e.g., NPN transistor or PNP transistor), insulated gate bipolar transistors (IGBTs), and/or junction field effect transistor (JFET) may be used in place of or in conjunction with the devices disclosed herein. The transistors may be depletion mode devices, drain-extended devices, enhancement mode devices, natural transistors or other types of device structure transistors. Furthermore, the devices may be implemented in/over a silicon substrate (Si), a silicon carbide substrate (SiC), a gallium nitride substrate (GaN) or a gallium arsenide substrate (GaAs).

References may be made in the claims to a transistor's control input and its current terminals. In the context of a FET, the control input is the gate, and the current terminals are the drain and source. In the context of a BJT, the control input is the base, and the current terminals are the collector and emitter.

References herein to a FET being "on" means that the conduction channel of the FET is present and drain current may flow through the FET. References herein to a FET being "off" means that the conduction channel is not present and drain current does not flow through the FET. An "off" FET, however, may have current flowing through the transistor's body-diode.

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter.

Modifications are possible in the described embodiments, and other embodiments are possible, within the scope of the claims.

What is claimed is:

1. A short detection circuit, comprising:
   a first transistor having a first current terminal, second current terminal, and a first control terminal;
   a first resistor coupled between the second current terminal and a ground terminal;
   a second transistor having a third current terminal, a fourth current terminal, and a second control terminal, in which:
   the third current terminal is coupled to the first current terminal; and
   the second control terminal is coupled to the first control terminal;
   a current source having a current output and a current input, in which the current input is coupled to the fourth current terminal;
   a second resistor coupled between the current output and the ground terminal;
   a switched capacitor circuit coupled between the current output and the ground terminal; and
   a comparator having a comparator output, a first comparator input, and a second comparator input, in which:
   the first comparator input is coupled to the switched capacitor circuit; and
   the second comparator input is coupled to a reference voltage terminal.

2. The short detection circuit of claim 1, further comprising a switch coupled between the second current terminal and a first terminal of the first resistor.

3. The short detection circuit of claim 2, further comprising:
a third transistor having a fifth current terminal, a sixth current terminal, and a third control terminal, in which the sixth current terminal is coupled to the first terminal of the first resistor; and
an amplifier having an amplifier output, a first amplifier input, and a second amplifier input, in which:
the first amplifier input coupled to the first terminal of the first resistor;
the second amplifier input is coupled to a bandgap voltage circuit; and
the amplifier output is coupled to the third control terminal;
wherein the switch is coupled between the sixth current terminal and the second current terminal.

4. The short detection circuit of claim 1, wherein the switched capacitor circuit includes:
a capacitor having a top plate and a bottom plate; and
a switch coupled between the top plate and the current output.

5. The short detection circuit of claim 4, wherein:
the switch is a first switch; and
the switched capacitor circuit includes:
a second switch coupled between the bottom plate and the ground terminal; and
a third switch coupled between the bottom plate and the first comparator input.

6. The short detection circuit of claim 1, wherein:
the first current terminal is coupled to a power terminal; and
the second current terminal is coupled to a load terminal.

7. The short detection circuit of claim 1, wherein the current source includes a current mirror circuit configured to generate a first current conducted by the second resistor based on a second current conducted by the second transistor.

8. A short detection circuit, comprising:
a first transistor configured to conduct a load current;
a switched load circuit coupled to the first transistor, the switched load circuit configured to switchably draw a test current;
a second transistor coupled to the first transistor, the second transistor configured to conduct a sense current, in which the sense current includes first and second portions, the first portion is representative of the load current, and the second portion is representative of the test current;
a switched capacitor circuit coupled to the second transistor, the switched capacitor circuit configured to generate a short detection voltage representative of the second portion; and
a comparator having an output, a first comparator input, and a second comparator input, in which the first comparator input is coupled to the switched capacitor circuit, and the comparator is configured to compare the short detection voltage to a short threshold voltage.

9. The short detection circuit of claim 8, wherein the switched load circuit includes:
a current source configured to receive the test current; and
a switch coupled between the first transistor and the current source, the switch configured to switchably connect the current source to the first transistor.

10. The short detection circuit of claim 9, wherein the current source includes:
a third transistor having a control terminal;
a resistor having first and second resistor terminals, in which the first resistor terminal is coupled to the third transistor, the second resistor terminal is coupled to a ground terminal, and the third transistor is coupled between the first resistor terminal and the switch; and
an amplifier having an amplifier output and first and second amplifier inputs, in which the first amplifier input is coupled to the first resistor terminal, the second amplifier input is coupled to a reference terminal, the amplifier output is coupled to the control terminal, the amplifier is configured to provide a control signal at the amplifier output responsive to voltages at the first and second amplifier inputs, and the third transistor is configured to conduct the test current responsive to the control signal.

11. The short detection circuit of claim 10, wherein:
the resistor is a first resistor;
the current source is a first current source; and
the short detection circuit includes:
a second current source coupled to the second transistor, the second current source configured to generate a current that is representative of the sense current; and
a second resistor coupled between the second current source and the ground terminal.

12. The short detection circuit of claim 11, wherein the second current source includes a current mirror circuit configured to generate the current that is representative of the sense current based on the sense current.

13. The short detection circuit of claim 11, wherein the switched capacitor circuit includes:
a capacitor having a top plate and a bottom plate; and
a first switch coupled between the second resistor and the top plate, the first switch configured to switchably connect the top plate to the second current source.

14. The short detection circuit of claim 13, wherein the switched capacitor circuit includes:
a second switch coupled between the bottom plate and the ground terminal, the second switch configured to switchably connect the bottom plate to the ground terminal; and
a third switch coupled between the bottom plate and the first comparator input, the third switch configured to switchably connect the bottom plate to the first comparator input.

15. The short detection circuit of claim 8, wherein the second comparator input is coupled to a reference voltage circuit configured to generate the short threshold voltage.

16. A system, comprising:
a power terminal;
a load terminal; and
an electronic fuse (EFUSE) circuit including:
a first transistor configured to conduct a load current from the power terminal to the load terminal;
a switched load circuit coupled to the first transistor, the switched load circuit configured to switchably draw a test current;
a second transistor coupled to the first transistor, the second transistor configured to conduct a sense current, in which the sense current includes first and second portions, the first portion is representative of the load current, and the second portion is representative of the test current;
a switched capacitor circuit coupled to the second transistor, the switched capacitor circuit configured to generate a short detection voltage representative of the second portion; and a comparator having an output, a first comparator input, and a second comparator input, in which the first comparator input is coupled to the switched capacitor circuit, and the comparator is configured to compare the short detection voltage to a short threshold voltage.

17. The system of claim 16, wherein the switched load circuit includes:

a current source configured to receive the test current; and a switch coupled between the first transistor and the current source, the switch configured to switchably connect the current source to the first transistor.

18. The system of claim 17, wherein the current source includes:

a third transistor having a control terminal;

a resistor having first and second resistor terminals, in which the first resistor terminal is coupled to the third transistor, the second resistor terminal is coupled to a ground terminal, and the third transistor is coupled between the first resistor terminal and the switch; and an amplifier having an amplifier output and first and second amplifier inputs, in which the first amplifier input is coupled to the first resistor terminal, the second amplifier input is coupled to a reference terminal, the amplifier output is coupled to the control terminal, the amplifier is configured to provide a control signal at the amplifier output responsive to voltages at the first and second amplifier inputs, and the third transistor is configured to conduct the test current responsive to the control signal.

19. The system of claim 18, wherein:

the resistor is a first resistor;

the current source is a first current source; and the system includes:

a second current source coupled to the second transistor, the second current source configured to generate a current that is representative of the sense current; and a second resistor coupled between the second current source and the ground terminal.

20. The system of claim 19, wherein the switched capacitor circuit includes:

a capacitor having a top plate and a bottom plate; and a first switch coupled between the second resistor and the top plate, the first switch configured to switchably connect the top plate to the second resistor and the second current source.

21. The system of claim 20, wherein:

the switched capacitor circuit includes:

a second switch coupled between the bottom plate and the ground terminal, the second switch configured to switchably connect the bottom plate to the ground terminal; and a third switch coupled between the bottom plate and a first input of the comparator; the third switch configured to switchably connect the bottom plate to the first input of the comparator; and the comparator includes a second input coupled to a reference voltage circuit, the reference voltage circuit configured to generate the short threshold voltage.

* * * * *